United States Patent
Weber et al.

(10) Patent No.: US 11,117,510 B2
(45) Date of Patent: Sep. 14, 2021

(54) VEHICLE LIGHT ASSEMBLY

(71) Applicant: NISSAN NORTH AMERICA, INC., Franklin, TN (US)

(72) Inventors: William Weber, Brighton, MI (US); Dale Butterworth, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/540,399

(22) Filed: Aug. 14, 2019

(65) Prior Publication Data

US 2021/0046863 A1 Feb. 18, 2021

(51) Int. Cl.
*B60Q 1/24* (2006.01)
*B60Q 1/00* (2006.01)
*F21S 41/141* (2018.01)
*F21Y 115/10* (2016.01)
*F21W 102/40* (2018.01)

(52) U.S. Cl.
CPC .............. *B60Q 1/24* (2013.01); *B60Q 1/0035* (2013.01); *B60Q 1/0041* (2013.01); *F21S 41/141* (2018.01); *B60Q 2400/50* (2013.01); *F21W 2102/40* (2018.01); *F21Y 2115/10* (2016.08)

(58) Field of Classification Search
CPC ...... B60Q 1/0035; B60Q 1/24; B60Q 1/0041; F21S 41/141
See application file for complete search history.

(56) References Cited

U.S. PATENT DOCUMENTS

| | | | |
|---|---|---|---|
| 9,869,438 B2 | 1/2018 | Zawacki | |
| 2002/0003696 A1* | 1/2002 | Kalana | B60Q 1/30 362/84 |
| 2007/0274087 A1* | 11/2007 | Herold | B60Q 1/2615 362/516 |
| 2011/0211362 A1* | 9/2011 | Heiden | B60Q 1/24 362/520 |
| 2012/0044090 A1 | 2/2012 | Kahler et al. | |
| 2013/0229820 A1* | 9/2013 | Jutila | B60Q 1/323 362/545 |
| 2014/0320823 A1* | 10/2014 | Ammar | B60Q 1/2665 353/13 |
| 2016/0090026 A1* | 3/2016 | Oliverio | B60Q 1/0035 362/516 |
| 2018/0141486 A1* | 5/2018 | Stinson | F21S 9/02 |
| 2018/0361915 A1* | 12/2018 | Kuhl | B60Q 1/2665 |
| 2019/0111847 A1* | 4/2019 | Messenger | B60Q 1/50 |

\* cited by examiner

*Primary Examiner* — Jong-Suk (James) Lee
*Assistant Examiner* — Christopher E Dunay
(74) *Attorney, Agent, or Firm* — Global IP Counselors, LLP (57) ABSTRACT

A vehicle light assembly includes a fixed structure, at least one light and an image projector. The fixed structure is configured to be assembled to a vehicle body component of a vehicle. The at least one light is fixed to the fixed structure and is configured to illuminate a first external area that is in the vicinity of the vehicle. The image projector is fixed to the fixed structure and is configured to project an image onto a second external area that is in the vicinity of the first external area.

19 Claims, 5 Drawing Sheets

VEHICLE LIGHT ASSEMBLY

BACKGROUND

Field of the Invention

The present invention generally relates to a vehicle light assembly. More specifically, the present invention relates to a vehicle light assembly for illuminating an exterior area of the vehicle.

Background Information

Vehicles can be equipped with welcome lights that include interior and exterior lights of a vehicle. For example, interior map lights are welcome lights that illuminate upon the vehicle has been unlocked or about to be unlocked. Additionally, vehicles can include exterior lights that illuminate when the vehicle is unlocked or about to be unlocked. Exterior lights can illuminate external areas that are in the vicinity of the vehicle. Exterior lights can include image projectors that project images such as the vehicle's logo or emblem.

SUMMARY

In view of the state of the known technology, one aspect of the present disclosure is to provide a vehicle light assembly comprising a fixed structure, at least one light and an image projector. The fixed structure is configured to be assembled to a vehicle body component of a vehicle. The at least one light is fixed to the fixed structure and is configured to illuminate a first external area that is in the vicinity of the vehicle. The image projector is fixed to the fixed structure and is configured to project an image onto a second external area that is in the vicinity of the first external area.

In view of the state of the known technology, another aspect of the present disclosure is to provide a vehicle comprising a rocker panel, a rocker panel trim, a light assembly, a light bar and an image projector. The rocker panel trim is fixedly attached to the rocker panel. The light assembly is assembled between the rocker panel and the rocker panel trim. The light assembly has a light bar and an image projector. The light bar is configured to illuminate a first external area that is in the vicinity of the vehicle. The image projector is fixed to the light bar and is configured to project an image in a second external area that is in the vicinity of the first external area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
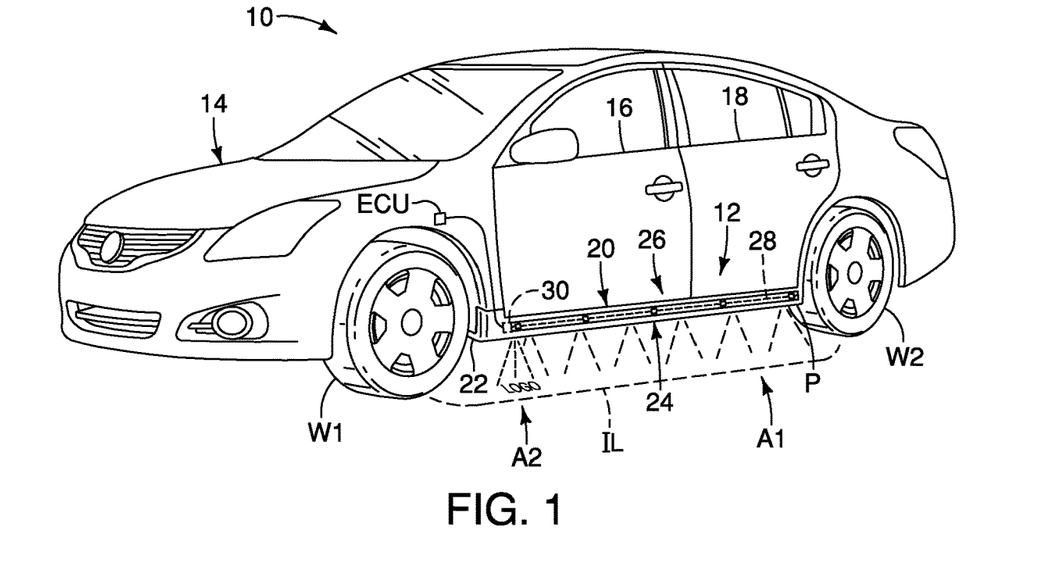
FIG. 1 is a front perspective view of a vehicle equipped with a vehicle light assembly of the illustrated embodiment.

Referring now to FIG. 1, a vehicle 10 equipped with a light system 12 is illustrated according to one embodiment of the invention. The vehicle 10 includes a vehicle body 14, a front door 16 (illustrated as driver's side), a rear door 18 (illustrated as driver's side), a rocker panel 20 and a rocker panel trim 22. In the illustrated embodiment, the rocker panel 20 and the rocker panel trim 22 are considered vehicle body 14 components of the vehicle 10 that at least partially define an underbody 24 of the vehicle 10. Although the light system 12 is illustrated as being disposed on the driver's side of the vehicle 10, it will be apparent to those skilled in the vehicle field from this disclosure that the rocker panel 20 and the vehicle 10 can include an additional rocker panel 20 (not shown) and rocker panel trim 22 (not shown) extending along the passenger's side, which can be similarly equipped with components of the light system 12 of the illustrated embodiment.

The underbody 24 defines an outer perimeter P of the vehicle 10. In the illustrated embodiment, the vehicle 10 further includes a light assembly 26 that is part of the light system 12. The light system 12 draws electrical power for operating the light assembly 26 from the electrical system for the vehicle 10. For example, the light assembly 26 is electrically connected to a welcome light control module WCU of the vehicle 10 that powers the light assembly 26 with electrical power from the vehicle's 10 electrical system. In the illustrated embodiment, the light system 12 further comprises interior map lights ML, best illustrated schematically in FIG. 8. The interior map lights ML are welcome lights configured to illuminate upon detecting an activation signal that signifies that the vehicle 10 is in a predetermined condition. In the illustrated embodiment, the predetermined condition is at least one of a condition in which the vehicle 10 has transitioned from a locked state to an unlocked state, and a condition in which the vehicle 10 is about to be transitioned from the locked state to the unlocked state. The operation of the light system 12 will be further discussed below.

The light assembly 26 illuminates an illuminated area IL that is exterior of the vehicle 10. In particular, the illuminated area IL is located beneath the underbody 24 and also the vicinity of the outer perimeter P of the vehicle 10. The illuminated area IL can extend the length of the vehicle's 10 side and can encompass the area located directly beneath underbody 24, the area located inboard of the perimeter P and the area located outboard of the perimeter P. Therefore, the illuminated area IL can include the ground that is located beneath the underbody 24 and in the vicinity of the outer perimeter P of the vehicle 10. While the illuminated area IL is illustrated as being projected near the driver's side of the vehicle 10, it will be apparent to those skilled in the vehicle field that the light assembly 26 can be implemented with the passenger's side to illuminate the ground in the vicinity of the passenger's side. It will be further apparent to those skilled in the vehicle field from this disclosure that while the light assembly 26 is illustrated as illuminating the ground in the vicinity of the driver's side doors, it will be apparent to those skilled in the vehicle field from this disclosure that the light assembly 26 can illuminate different external areas that are in the vicinity of the vehicle 10 as needed and/or desired.

The light assembly 26 of the illustrated embodiment can be considered an underglow light assembly 26 or ground effects that is attached to the underbody 24 or beneath the chassis of the vehicle 10. In the illustrated embodiment, the light assembly 26 is disposed between the rocker panel trim 22 and the rocker panel 20. The light assembly 26 projects light from the rocker panel trim 22 towards the illuminated area IL. The light assembly 26 is oriented and/or constructed to illuminate the illuminated area IL either alone or in combination with the vehicle's 10 exterior lights (e.g., taillights or parking lights). It will be apparent to those skilled in the vehicle field from this disclosure that the light assembly 26 can be implemented to illuminate the illuminated area IL by itself or in combination with other exterior lights of the vehicle 10.

The rocker panel 20 is a rigid panel preferably made of a durable material, such as stamped steel. The rocker panel 20 extends longitudinally along the front and rear doors 16 and 18 and is disposed below the front and rear doors 16 and 18. The rocker panel 20 extends between a front wheel well W1 and a rear wheel well W2 along the bottom sides of the vehicle 10. The rocker panel 20 forms the juncture of the underbody 24 with the front and rear doors 16 and 18 and at least partially defines the outer perimeter P of the vehicle 10. It will be apparent to those skilled in the vehicle field that the vehicle 10 additionally includes a passenger's side rocker panel 20 (not shown) that also at least partially defines the outer perimeter P of the vehicle 10.

Figure 3:
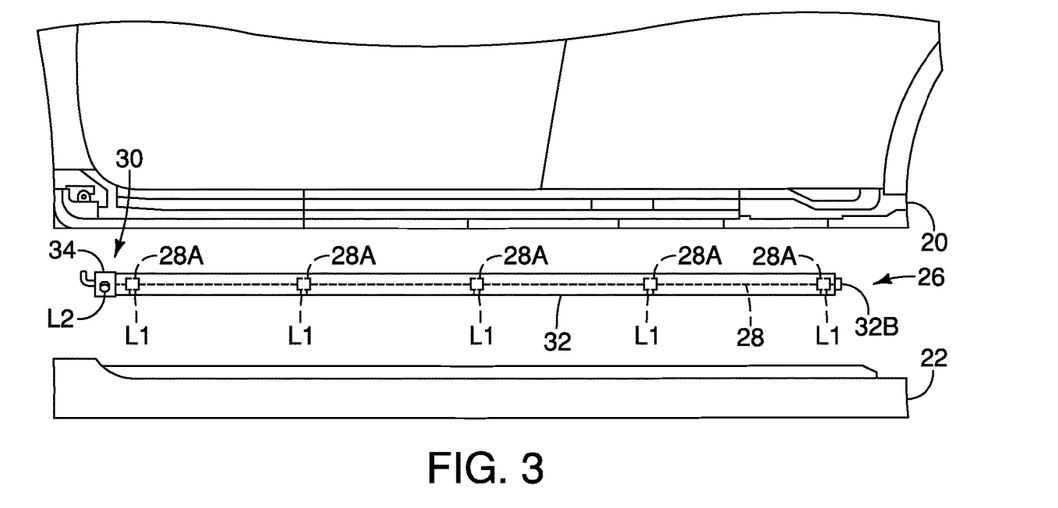
FIG. 3 is a side elevational view similar to FIG. 2, with a rocker panel trim and a vehicle light assembly exploded from the vehicle body.

The rocker panel trim 22 is a rigid piece of plastic or metal trim that is placed over the rocker panel 20. The rocker panel trim 22 is fixedly attached to the rocker panel 20 by any suitable fastening means to conceal or cover all or a portion of the rocker panel 20. As shown in FIG. 3, the light assembly 26 is assembled between the rocker panel 20 and the rocker panel trim 22. More specifically, in the illustrated embodiment, the light assembly 26 is installed to the rocker panel 20. The light assembly 26 is preferably mounted such that the light assembly 26 is substantially or entirely enclosed by the rocker panel trim 22. Accordingly, the components of the light assembly 26 are protected from environmental conditions or debris by the rocker panel trim 22. Preferably, the rocker panel trim 22 includes apertures (not shown) that correspond to the positions of the light sources L1 of the light assembly 26 such that projected light is emitted through the apertures. Preferably, the light sources L1 include lens (not shown) that are sized and dimensioned for a snug fit in the apertures to enclose the apertures and further protect the other components of the light assembly 26.

The light assembly 26 is made and configured for quick and easy installation to one or both sides of the vehicle as needed and/or desired. The light assembly 26 can be sold as an aftermarket accessory that is subsequently installed to the vehicle at the purchaser's wishes.

The light assembly 26 operates to illuminate the illuminated area IL that is the vicinity of the rocker panel 20 and the rocker panel trim 22. Therefore, the light assembly 26 of the illustrated embodiment is mounted at the underbody 24 of the vehicle 10 for illuminating the illuminated area IL in the vicinity of the vehicle 10.

Figure 4:
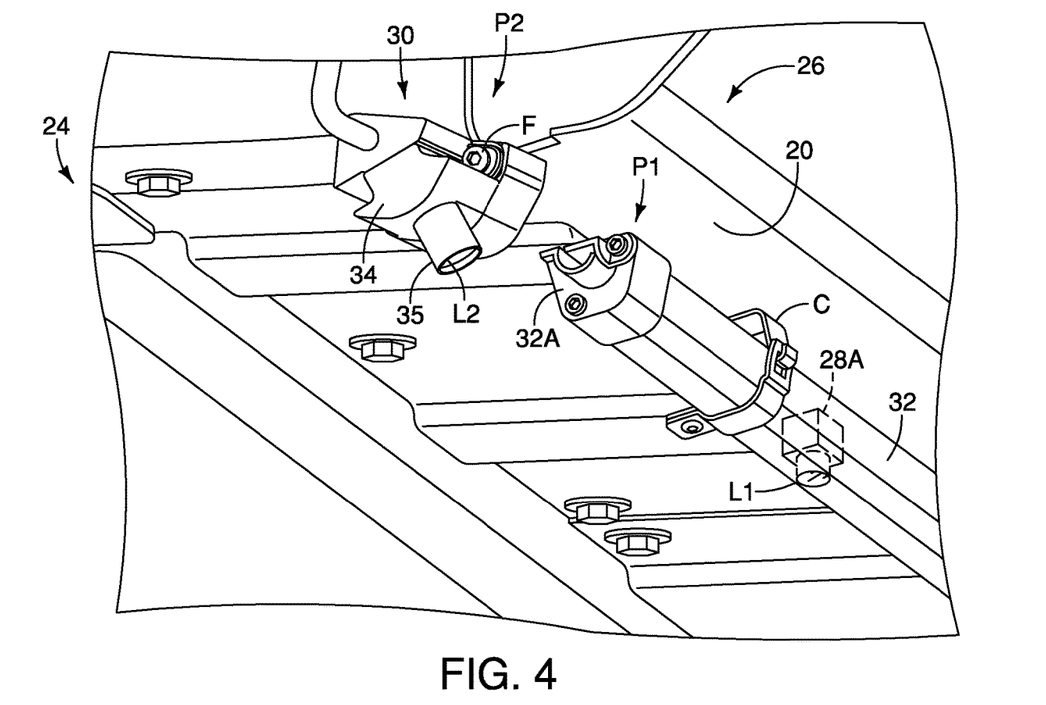
FIG. 4 is an enlarged perspective view of the vehicle light assembly illustrated in FIG. 3 having a light bar and an image projector.

Referring to FIGS. 3 and 4, the light assembly 26 has a light bar 28 and an image projector 30. The light bar 28 includes a fixed structure 32 and light sources L1 that are long-life LEDs disposed on the fixed structure 32 via base members 28A. The light sources L1 are preferably shielded in the base members 28A by rubber isolators (not shown) designed to reduce vibrations and will improve component life. Therefore, the light bar 28 includes at least one light L1 that is preferably an LED. For simplicity, the light sources L1 will alternatively be referred to as LEDs L1. In other words, the light bar 28 includes a plurality of lights that are LEDs L1, with each of the plurality of lights L including a light source that is a LED L1. The LEDs L1 can be surface-mount LEDs configured to emit light with any of a variety of colors, color temperatures or other properties.

Figure 2:
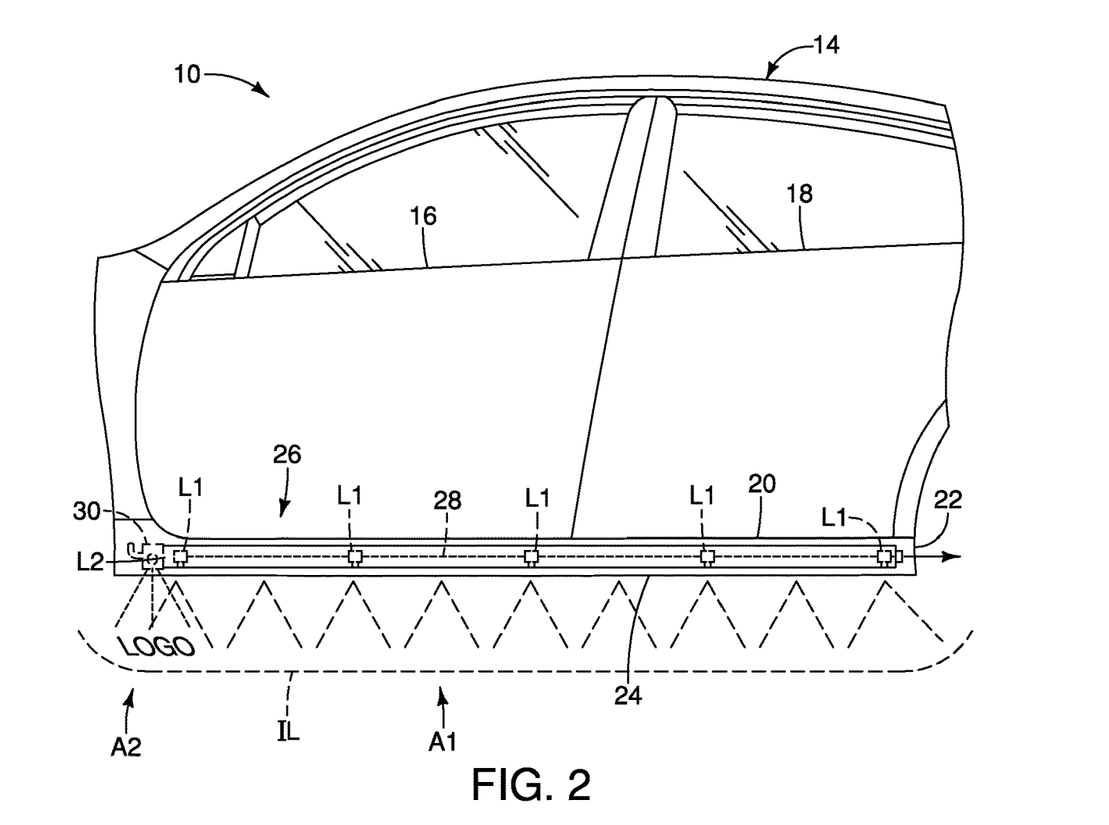
FIG. 2 is a side elevational view of a portion of the vehicle illustrated in FIG. 1.

As best seen in FIGS. 1 and 2, the light bar 28 is configured to illuminate a first external area A1 that is in the vicinity of the vehicle 10. As shown, the first external area A1 is part of the illuminated area IL. The fixed structure 32 of the light bar 28 is configured to be assembled the rocker panel 20. In other words, the fixed structure 32 is configured to be assembled to a vehicle body 14 component of the vehicle 10. As shown, the fixed structure 32 is an elongated member. The LEDs L1 are distributed along the longitudinal length of the fixed structure 32. The LEDs L1 are fixed to the fixed structure 32 and is configured to illuminate the first external area A1 that is in the vicinity of the vehicle 10. The fixed structure 32 can be fastened to the rocker panel 20 by any suitable means, such as by adhesive, tape, fastener(s), clip(s), clamp(s) or via snap-fit connection(s). In the illustrated embodiment, the fixed structure 32 is fastened to the rocker panel 20 via a clamp C.

The fixed structure 32 can also be configured to function as an auxiliary mounting component for the light assembly 26. For example, the fixed structure 32 can emit and/or distribute light produced by the LEDs L1 of the light assembly 26. The fixed structure 32 can also include features for effecting a light distribution of the light assembly 26. For example, the fixed structure 32 can be configured to distribute the light produced by the LEDs L1 and projected towards the first external area A1. For example, the fixed structure 32 can include one or more angled facet(s) that can distribute light produced by the LEDs L1 at different desired angles. Additionally, the fixed structure 32 can include reflective material to deflect light across the underbody 24 and around the outer perimeter P of the vehicle. In the illustrated embodiment, while the light bar 28 is illustrated as including five LEDs L1 distributed along the fixed structure 32, it will be apparent to those skilled in the vehicle field from this disclosure that the number and spacing of the LEDs L1 of the light assembly 26 can vary as needed and/or desired.

As best seen in FIGS. 3 and 4, the LEDs L1 or lights are fixed to the fixed structure 32 at a first location P1 and the image projector 30 is fixed to the fixed structure 32 at a second location P2 that is different from the first location P1. The image projector 30 is fixed to the fixed structure 32 and is configured to project an image onto the second external area A2. In the illustrated embodiment, the image projector 30 is a logo projector that projects a logo or emblem (e.g., the projected image) of the vehicle 10. However, it will be apparent to those in the vehicle field from this disclosure that the image projector 30 can project other types of images (e.g., the date or time information) and/or messages (e.g., "welcome").

The image projector 30 is configured to project an image in a second external area A2 that is in the vicinity of the first external area A1. As shown, the first and second external areas A1 and A2 are adjacent to each other. Additionally, the first and second external areas A1 and A2 can overlap with one another. In other words, the image projector 30 can project the image onto an area that is illuminated by the light bar 28. Thus, the second external area A2 is part of the illuminated area IL. The lights L1 of the light bar 28 and the image projector 30 are configured to illuminate the first and second external areas A1 and A2 in concert. The light bar 28 and the image projector 30 will be discussed in further detail below.

Figure 5:
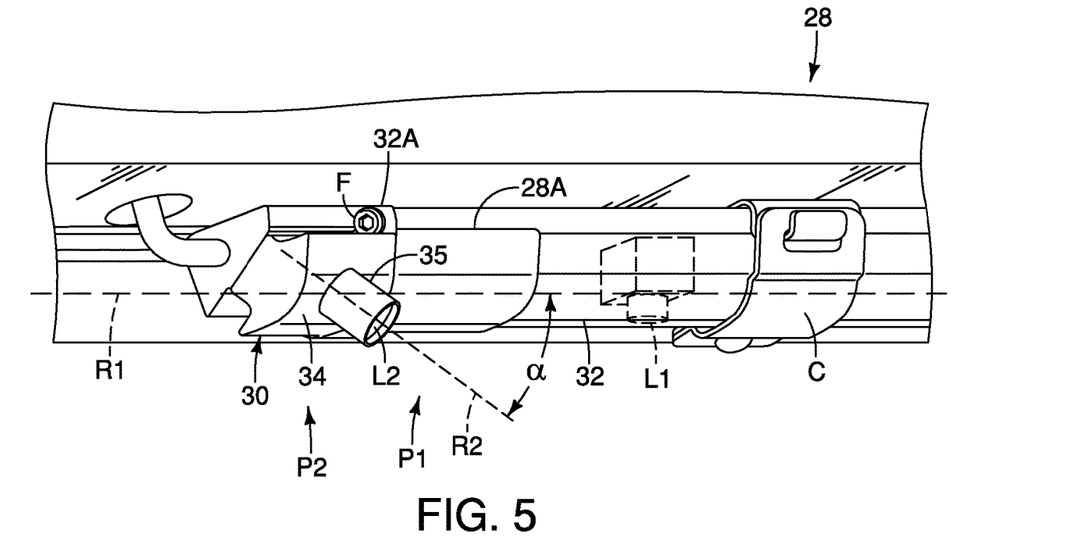
FIG. 5 is an enlarged perspective view of the vehicle light assembly illustrated in FIGS. 3 and 4 with the image projector installed onto the light bar.
Figure 6:
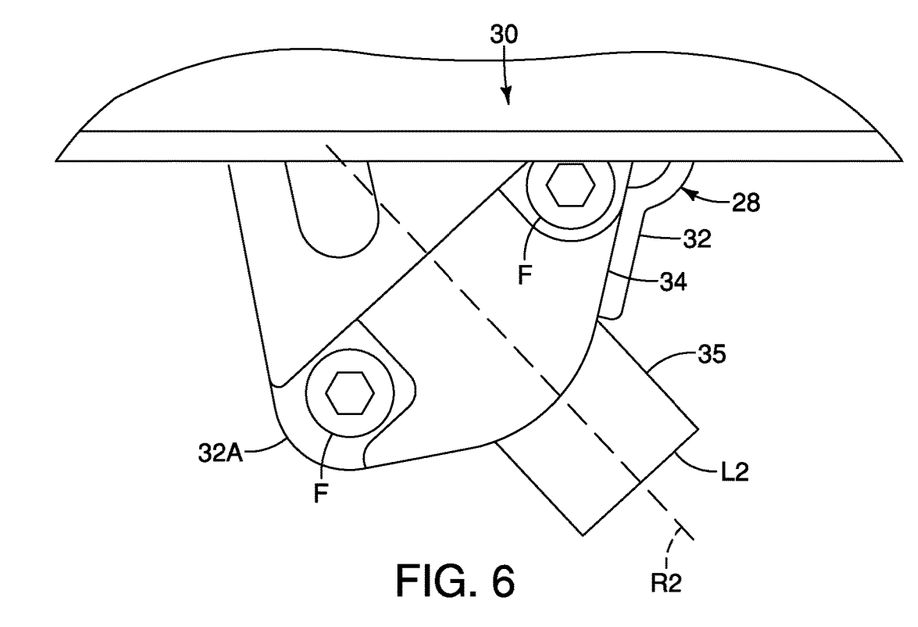
FIG. 6 is a top view of the image projector illustrated in FIGS. 4 and 5.

In the illustrated embodiment, the image projector 30 is fixed to the light bar 28, as best seen in FIGS. 3 to 5. Specifically, the image projector 30 is fixed to an end of the fixed structure 32 by conventional means, such as via one or more fasteners F (e.g., first and second fasteners F). The first and second fasteners F are bolts connecting the image projector 30 to the end of the light bar 28. As shown, the fixed structure 32 includes a first longitudinal end 32A and a second longitudinal end 32B. The image projector 30 is mounted to the first end 32A of the fixed structure 32. Alternatively speaking, the image projector 30 is mounted to a longitudinal end of the light bar 28. In the illustrated embodiment, the image projector 30 is mounted to the first end 32A that is a car forward end. As shown, the first end 32A is disposed below the driver's side door. It will be apparent to those skilled in the vehicle field from this disclosure that the image projector 30 can be alternatively fixed to the second end 32B of the light bar 28. It will also be apparent to those skilled in the vehicle field from this disclosure that the length and location of the light bar 28 can vary such that the location of the image projector 30 will also vary with respect to the underbody 24.

Figure 7:
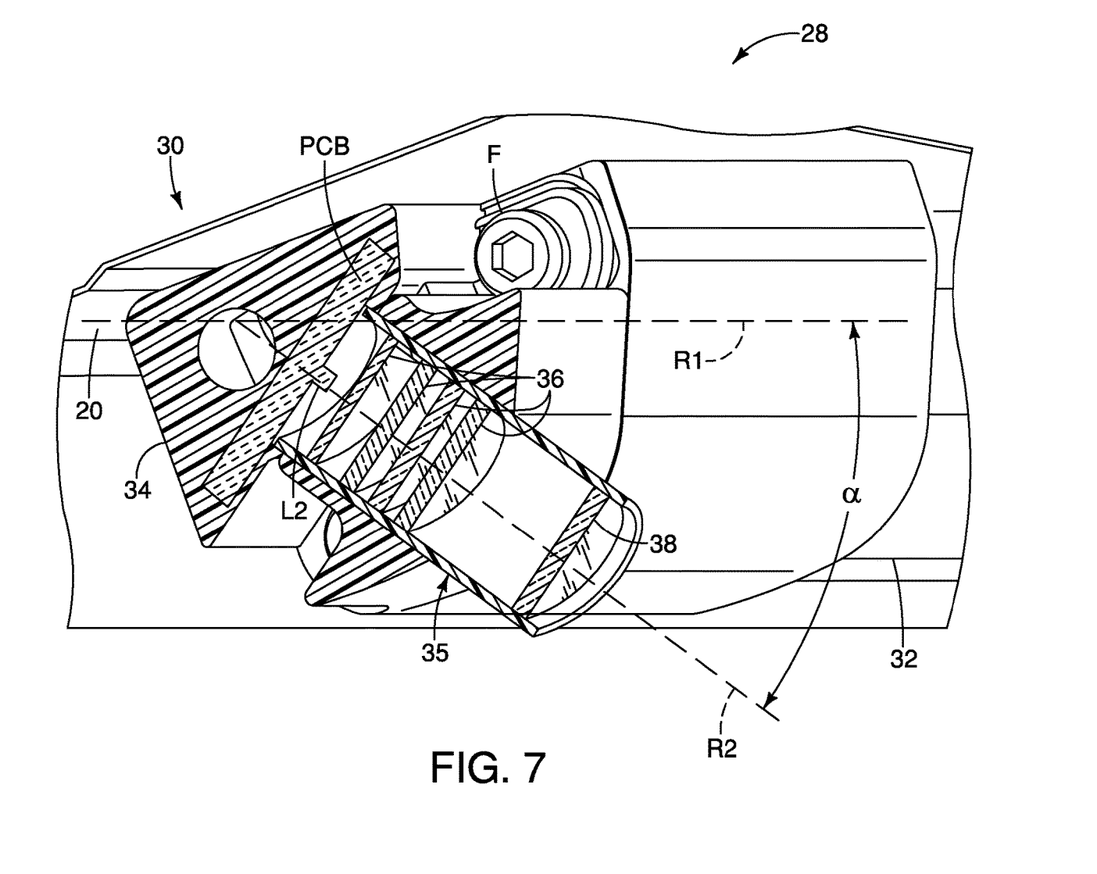
FIG. 7 is a cross-sectional view of the image projector illustrated in FIG. 6.

The image projector 30 includes a housing 34 having an emitting portion 35 projecting at an angle with respect to the fixed structure 32. As seen in FIG. 7, the housing 34 houses a light source L2 that illuminates the image projected by the image projector 30. In the illustrated embodiment, the light source L2 of the image projector 30 is also an LED L2. In this disclosure, the light source L2 of the image projector 30 will alternatively be referred to as LED L2. The housing 34 of the image projector 30 further houses a circuit board PCB that mechanically supports and electrically connects the light source to an electric control module ECU of the lighting system (seen in FIG. 8). The circuit board PCB can be conventional and include one or more layers of copper laminated onto a non-conductive substrate. Therefore, the circuit board PCB is electrically connected to the electric control module ECU of the lighting system, as will be further explained below. The circuit board PCB is electrically connected to the LED L2 (i.e., the light source) of the image projector 30 to regulate electric current transferred from the electric control module ECU to the LED L2 of the image projector 30. The LED L2 of the image projector 30 preferably emits at least one beam with a wavelength between 15 and 1100 nanometers of visible light.

As seen in FIG. 7, the image projector 30 includes a lens stack 36 that is downstream of the LED L2. The lens stack 36 is a set of optics that are transparent plates with a nanometric surface treatment, such as etchings. The etchings provide a diffuse reflection on one side of the plates but not on the other in order to facilitate the passing of consistent light beams in a particular order. In this way, the image projector 30 generates the projected image as projected laser light. The image projector 30 further includes a protective lens 38 downstream of the lens stack 36. The protective lens 38 can include reflective material disposed at a portion of the outer surface of the lens to deflect light that would otherwise be wasted across the underbody 24. The image that is projected can be imprinted onto the surface protective lens 38. For example, the logo that is to be projected can be painted or imprinted onto the protective lens 38.

Preferably, the image projector 30 includes a lens that is capable of skewing the projected image to compensate for a mounting angle α of the image projector 30, best illustrated in FIG. 7. In the illustrated embodiment, the mounting angle α is the angle between the emitting portion 35 and the fixed structure 32. More specifically, in the illustrated embodiment, the mounting angle α of the image projector 30 refers to the angle formed between a reference plane R1 extending parallel with the longitudinal length of the light bar 28 and a line R2 bisecting the image projector 30. The line R2 defines the direction of the light beam projected by the LED L2. Preferably, either any of the lenses of the lens stack 36 or the protective lens 38 can compensate for the mounting angle α. For example, the protective lens 38 can include angled facet(s) to distribute the light produced by the LED L2 at different desired angles. In this way, the projected image appears not skewed on the second external area A2. Additionally, the projected image can be of a desired size.

Figure 8:
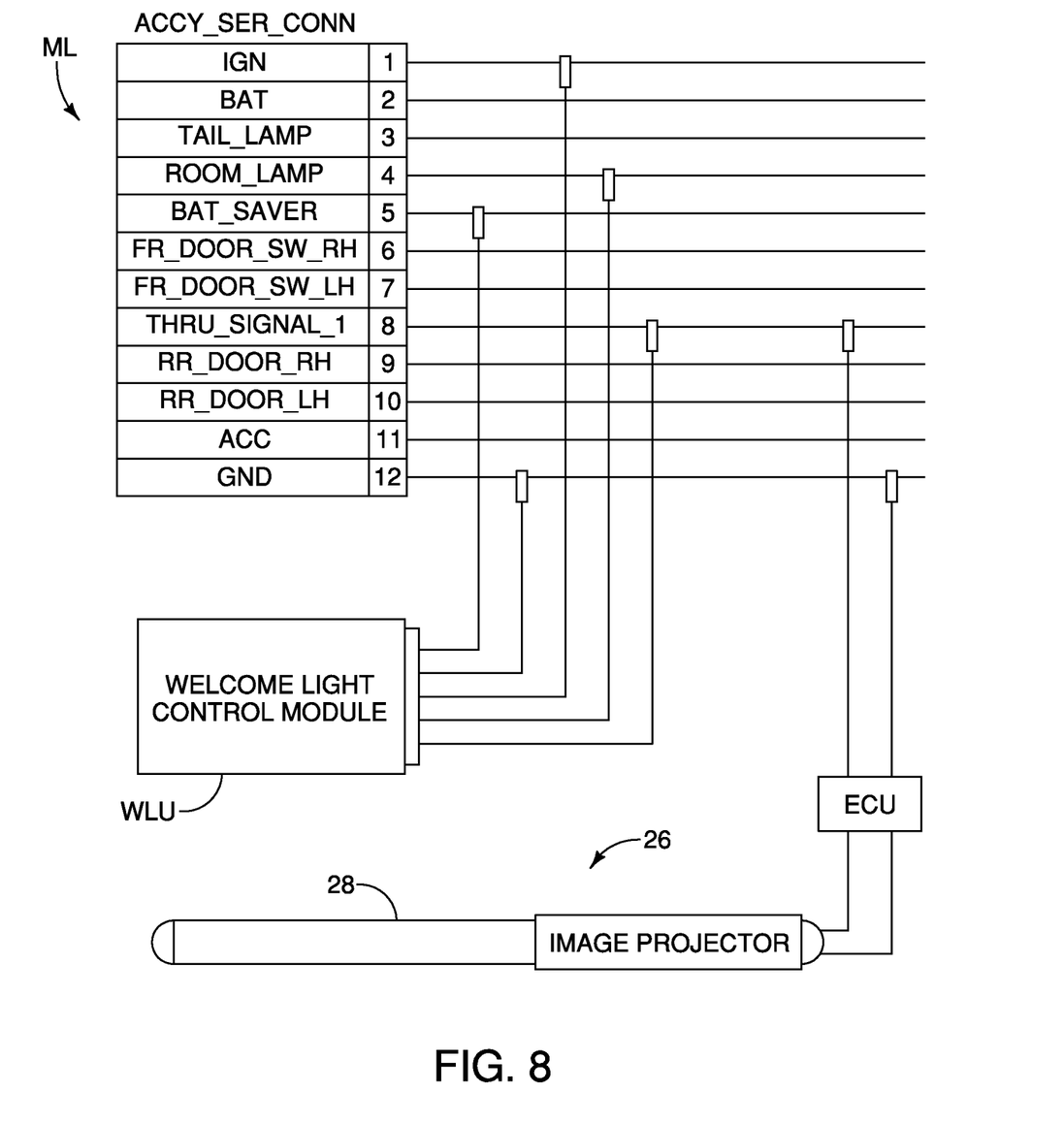
FIG. 8 is a light system of the vehicle having the light assembly.

Referring to FIG. 8, the electric control module ECU or electric control unit electrically controls the components of the light system 12. Specifically, the electric control module ECU electrically controls the LEDs L1 of the light bar 28 and the LED L2 of the image projector 30. As illustrated, the electric control module ECU is part of the light assembly 26. The electric control module ECU preferably includes a microcomputer that includes one or more processor(s) and one or more storage device(s) (i.e., a computer memory device). The memory is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM (Random Access Memory) device, a hard disk, a flash drive, etc. The storage device is configured to store settings, programs, data, calculations and/or results of the processor(s).

The electric control module ECU is electrically connected to the light bar 28 and the image projector 30. The electric control module ECU provides electrical power to both the light bar 28 and the image projector 30. The electric control module ECU is electrically connected to and electrically operates the LEDs L1 and L2 of the light bar 28 and the image projector 30. In the illustrated embodiment, the electric control module ECU operates with the welcome light electric control module ECU that operates the interior map lights ML and the other welcome lights of the vehicle 10. In particular, the electric control module ECU is also configured to provide electrical power to the light bar 28 and the image projector 30 in concert with the interior map lights ML of the vehicle 10. Thus, the electronic control module can also be considered to operate welcome lights and the light assembly 26 can also be considered welcome lights of the vehicle. In other words, the LED L2 of the image projector 30 and the LEDs L1 of the light bar 28 are configured to activate at the same time to illuminate the illuminated area 1L. Additionally, the light assembly 26 preferably activates at the same time as the interior map lights ML such that the illuminated area IL is illuminated when the interior map lights ML turn ON.

As seen in FIG. 8, once the interior map light comes ON (controlled via the welcome light control module WCU of the vehicle 10), the electric control module ECU controls the light bar 28 to activate the LEDs L1 and the LED L2 of the image projector 30. As stated, the power for the light assembly 26 is supplied by the welcome light control module WCU. The power from the welcome light control module WCU provides power both sets of the LEDs L1 and L2 in parallel so they come on in concert or at the same time. Preferably, the LEDs L1 and L2 of the light assembly 26 are configured to turn OFF along with the interior map lights ML after a predetermined time period. Alternatively, the LEDs L1 and L2 of the light assembly 26 and the interior map lights ML can turn OFF automatically in concert when the ignition is turned ON.

As stated, in the illustrated embodiment, the LEDs L1 and L2 of the light assembly 26 and the interior map lights ML are considered welcome lights. In other words, the LEDs of the light bar 28 and the LED of the image projector 30 are welcome lights that are configured to illuminate upon detecting an activation signal that signifies that the vehicle 10 is in the predetermined condition. For example, the vehicle 10 can be equipped with an activation sensor (not shown) that transmits the activation signal signifying that the predetermined condition has been has been met. The activation sensor can transmit the activation signal to either or both of the electric control module ECU or the welcome light control module WCU. As stated, in the illustrated embodiment, the predetermined condition can be a condition in which the vehicle 10 has transitioned from a locked state to an unlocked state. For example, in the event that the driver unlocks the vehicle 10, the activation sensor can detect a signal from the driver's key fob to unlock the vehicle 10. The activation sensor can transmit the activation signal to the electric control module ECU, which thereafter activates the LEDs L1 and L2 of the light assembly 26. The predetermined condition can also be a condition in which the vehicle is about to be transitioned from the locked state to the unlocked state. For example, the driver approaches the vehicle 10 and the activation sensor detects the presence of the key fob in the vehicle's 10 vicinity. Sensing the key fob in the vicinity means that the vehicle 10 is about to be transitioned from the locked state to the unlocked state. In this circumstance, the activation sensor can transmit the activation signal to the electric control module ECU, which thereafter activates the lights L1 and L2 of the light assembly 26.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle light assembly. Accordingly, these terms, as utilized to describe the present invention should be interpreted relative to a vehicle equipped with the vehicle light assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle light assembly comprising:
   a fixed structure configured to be assembled to a vehicle body component of a vehicle, the fixed structure being an elongated member;
   at least one light fixed to the fixed structure and is configured to illuminate a first external area that is in the vicinity of the vehicle;
   an image projector having a housing that is fitted to an end of the fixed structure, the housing having a circuit board and an emitting portion that houses a light source and a lens stack, the circuit board being electrically connected to the light source to regulate electric current to the light source, the emitting portion being configured to project an image onto a second external area that is in the vicinity of the first external area; and
   a first fastener and a second fastener fixing the housing of the image projector to the end of the fixed structure, the emitting portion extending between the first and second fasteners.

2. The vehicle light assembly according to claim 1, wherein
   the image projector is a logo projector that projects a logo of the vehicle.

3. The vehicle light assembly according to claim 2, wherein
the at least one light is a welcome light of the vehicle that is configured to illuminate upon detecting an activation signal that signifies that the vehicle is in a predetermined condition,
the predetermined condition being at least one of a condition in which the vehicle has transitioned from a locked state to an unlocked state, and a condition in which the vehicle is about to be transitioned from the locked state to the unlocked state.

4. The vehicle light assembly according to claim 3, wherein
the at least one light and the image projector are configured to illuminate the first and second external areas in concert.

5. The vehicle light assembly according to claim 2, wherein
the at least one light is fixed to the fixed structure at a first location and the image projector is fixed to the fixed structure at a second location that is different from the first location.

6. The vehicle light assembly according to claim 1, wherein
the at least one light includes a plurality of lights that are fixed to the fixed structure.

7. The vehicle light assembly according to claim 6, wherein
the housing houses a light source that illuminates the image projected by the image projector.

8. The vehicle light assembly according to claim 7, wherein
the light source of the image projector is a light emitting diode, and each of the plurality of lights includes a light source that is a light emitting diode.

9. The vehicle light assembly according to claim 7, further comprising
an electric control module that is electrically connected to the at least one light and the image projector, the electric control module providing electrical power to both the at least one light and the image projector.

10. The vehicle light assembly according to claim 6, wherein
the light source of the image projector is disposed adjacent to one of the light sources of the plurality of lights that are fixed to the fixed structure.

11. The vehicle light assembly according to claim 1, wherein
the first and second fasteners are bolts.

12. The vehicle light assembly according to claim 1, wherein
the emitting portion protrudes relative to the fixed structure when the housing is fixed to the fixed structure.

13. A vehicle comprising:
a rocker panel;
a rocker panel trim that is fixedly attached to the rocker panel; and
a light assembly assembled between the rocker panel and the rocker panel trim, the light assembly having
a light bar that is configured to illuminate a first external area that is in the vicinity of the vehicle,
an image projector having a housing that is fitted to an end of the light bar,
the housing having a circuit board and an emitting portion that houses a light source and a lens stack, the circuit board being electrically connected to the light source to regulate electric current to the light source, the emitting portion being configured to project an image in a second external area that is in the vicinity of the first external area, and
a first fastener and a second fastener fixing the housing of the image projector to the end of the fixed structure, the emitting portion extending between the first and second fasteners.

14. The vehicle lighting system according to claim 13, wherein
the light assembly is installed to the rocker panel.

15. The vehicle lighting system according to claim 13, wherein
the light bar includes a plurality of light sources that illuminate the first external area.

16. The vehicle lighting system according to claim 13, wherein
the light assembly further comprises an electric control module that is electrically connected to the light bar and the image projector, the electric control module providing electrical power to both the light bar and the image projector.

17. The vehicle lighting system according to claim 16, further comprising
interior map lights that are welcome lights configured to illuminate upon detecting an activation signal that signifies that the vehicle is in a predetermined condition,
the predetermined condition being at least one of a condition in which the vehicle has transitioned from a locked state to an unlocked state, and a condition in which the vehicle is about to be transitioned from the locked state to the unlocked state.

18. The vehicle lighting system according to claim 17, wherein
the electric control module is a welcome light electric control module that is configured to provide electrical power to the light bar and the image projector in concert with the interior map lights of the vehicle.

19. The vehicle lighting system according to claim 1, wherein
the fixed structure is stationary with respect to a vehicle body having the vehicle body component.

* * * * *